UNITED STATES PATENT OFFICE.

HEINRICH F. D. SCHWAHN, OF KANSAS CITY, MISSOURI.

METHOD OF SEPARATING AND RECOVERING THE CONSTITUENTS OF ORES, EARTHS, CLAYS, &c.

SPECIFICATION forming part of Letters Patent No. 514,041, dated February 6, 1894.

Application filed March 3, 1893. Serial No. 464,566. (No specimens.)

*To all whom it may concern:*

Be it known that I, HEINRICH F. D. SCHWAHN, a citizen of the United States, and a resident of Kansas City, in the county of Jackson and State of Missouri, have invented a certain new and useful Improvement in Methods of Separating and Recovering the Constituents of Ores, Earths, Clays, &c., of which the following is a full, clear, and exact description.

The invention consists in an improved process including certain features of novelty hereinafter described and pointed out in the claims by which the constituents of said ores, earths, clays, &c., some of them or all may be carried into chlorides and sulfates and separated in accordance with their nature, to be recovered and used in the art for smelting, as pigments or for other industrial purposes, and the theory of the process is based upon the rapid oxidation of the metallic or minerallic constituents of the said ores, earths, clays, and to carry the same into chlorides and sulfates according to their nature and condition, and their subsequent separation by evaporation, lixiviation, sublimation, washing and floating.

The process I carry out by the aid of suitable mixers, subliming furnaces and suitable accessories such as usually used for such purpose.

My improved method of separating and recovering the constituents of ores, earths, clays, &c., carrying iron, gold, silver, platinum, magnesia, lead, zinc, alumina, baryta, and others, consists in treating the said ores, earths, clays, &c., with nitro-hydro-chloric acid as an oxidant and to furnish the chlorine, and sulfuric acid to create a reaction with the same and I preferably apply the said nitro-hydrochloric acids directly from their natural sources and in their nascent condition. Therefore in carrying out my invention I take preferably chloride of sodium (common salt) and nitrate of soda or potassa to deliver, if decomposed by sulfuric acid, the said nitro-hydro-chloric acid as the oxidizing agent and source of the chlorine, the sulfuric acid thereby serving repeatedly first in the form as the same is introduced and then in combination with the sodium or potassium from the employed chloride of sodium or nitrate of soda or potassa as sulfates as decomposer and to produce sulfates.

In carrying out my invention I take for example a certain earth being composed of iron, baryta, alumina, carrying gold, silver and sulfide of lead, &c. In this case I will preferably grind the ore and mix the same with the chloride of sodium and nitrate and in such quantity that if decomposed by sulfuric acid sufficient chlorine will be evolved to carry all iron or silver and gold which may be present and have the most affinity for chlorine into chlorides, and merely accidentally such other constituents which have more affinity for sulfur in their certain condition into sulfates, and I employ the said chemicals in the ratio of about two parts of chloride of sodium, about one part of nitrate and about three parts of sulfuric acid preferably of about 66° Baumé, all by weight, and these given quantities are in general sufficient for about one-hundred parts of said earth, &c., and I add some water to act as a vehicle; but preferably I bring the chloride of sodium and nitrate into the form of a solution with said water and I use so much water for the purpose that the earth if mixed with the above given chemicals will form a plastic mass like mortar.

The *modus operandi* is as follows:

First. I take the said earth, have it ground and mixed with said solution of chloride of sodium and the said solution of nitrate of sodium or potassium, and I preferably carry this out in a closed mixer provided with a stirring arrangement. To this mixture I add, while constantly agitating, the said sulfuric acid. The accidental eliminated gases I preferably confine within the mixer to be absorbed by the resulting mass.

Second. The resulting mixture I place in a suitable sublimation furnace and heat the mass to a temperature not exceeding about 80° centigrade to finish the formation of chlorides. Then I increase the temperature to about 150° centigrade to evaporate and expel the produced volatile ferric-chloride with the waste nitro-hydro-chloric acid which I recover in a suitable annexed receiver to receive further treatment as seems necessary.

Third. Then I leach the remaining mass with suitable solvents as will be understood by those skilled in the art to separate and recover the formed non-volatile, but soluble chloride of gold and silver, and the soluble sulfates like sulfate of sodium or potassium produced within the decomposition from the chloride of sodium and nitrate and others like magnesia, &c. The said solvents which I have in view are as follows: For leaching out the said produced chloride of gold, sulfate of sodium or potassium and magneia I use water, and for leaching out the said produced chloride of silver I use preferably ammonia and on these properties that the former salts are soluble in water and the latter salt is soluble in ammonia and not in water, I have based my separation and recovering of said salts. The precipitation of gold from the said solution will be done as usually by iron, &c., and the chloride of silver I separate by evaporating the ammonia, and if desired I reduce the same by heating with hydrogen gas.

Fourth. The remaining mass I place in a suitable sublimation furnace in connection with a receiver to sublime and recover such sulfates like sulfate of lead and others of the same nature.

Fifth. Then I wash and float the remaining earthy mass to perfectly sweeten the same, and separate the lighter from the heavier part to be used after drying for pigments, &c. The washing and floating I carry out as usually done in such cases by immersing the said refuse from the sublimation in water, within a suitable receptacle, and after thoroughly stirring, the heavier part is to settle first, and the lighter part is to be drawn off, of course with the water, into another suitable receptacle to settle also. By this arrangement it will be seen that the heavier constituents of the said remainder, per example, baryta will be separated from the lighter, per example, alumina and silica to be recovered accordingly.

Now in certain cases it would be unnecessary to go through the entire process, especially if an ore free of iron shall be treated, and as in such cases the applied chemicals may be greatly reduced I advantageously leach the formed mass at once, as soon as the reaction has been finished with the formation of the soluble salts. The remaining earthy mass can then be treated as seems necessary or profitable. At this point it may be well to state that all recovered constituents of said ores, &c., can be further treated, as seems necessary, to carry the same into another condition or form and I do not confine myself to certain methods to carry this out as the same may be varied to suit the exigencies of the case. The proportion of the employed chemicals may be varied especially if magnetic iron should be present in the ore, in which case then a greater proportion of nitrate is used.

I have a process described and claimed for obtaining purified sulfurous earth of alumina or iron free, &c., from their ores, filed June 21, 1892, Serial No. 439,519, and a process of purifying alumina filed October 4, 1892, Serial No. 447,854, and a process for purifying natural sulfate of baryta, filed February 23, 1893, Serial No. 463,452, for accomplishing partly the same results, to wit, the separating of the iron in form of ferric-chloride from aluminous ores and baryta and the converting of alumina contained in said ores into a sulfate is concerned, but my present process differs in so far with these processes, that in this process any ore, earth, clay, &c., can be treated and their constituents separated and recovered according to their nature and condition by evaporation, lixiviation, sublimation, washing and floating.

I claim as my invention—

1. The herein described method to separate and recover the constituents of ores, earths, clays &c., consisting in treating the same with nitro-hydrochloric and sulfuric acids in the manner as specified; then heating the resulting mass to about 80° centigrade, then raising the temperature to about 150° centigrade to expel and recover the produced ferric-chloride and waste acids; then leaching the remaining mass to remove and recover the formed soluble salts, subsequently sublimating then washing and floating, substantially as and for the purpose set forth.

2. The herein described method to separate and recover the constituents of ores, earths, clays &c., consists in grinding and mixing the same with chloride of sodium and nitrate of soda or potassa, then adding sulfuric acid to the resulting mixture and heating the same to about 80° centigrade to finish the resulting reaction, then raising the temperature to about 150° centigrade to expel and recover the produced ferric-chloride and waste acids, then leaching the remaining mass to remove and recover the formed soluble salts, subsequently sublimating, then washing and floating, substantially as and for the purpose set forth.

HEINRICH F. D. SCHWAHN.

Witnesses:
JOHN T. MARSHALL,
HENRY STUBENRAUCH.